United States Patent [19]
Ueda

[11] Patent Number: 4,533,158
[45] Date of Patent: Aug. 6, 1985

[54] SEAT BELT LATCH DEVICE

[75] Inventor: Takeo Ueda, Fujisawa, Japan

[73] Assignee: Nippon Seiko Kabushiki Kaisha, Japan

[21] Appl. No.: 213,475

[22] Filed: Dec. 5, 1980

Related U.S. Application Data

[63] Continuation of Ser. No. 62,550, Jul. 31, 1979, abandoned.

[51] Int. Cl.³ .............................................. B60R 21/10
[52] U.S. Cl. .................................................... 280/804
[58] Field of Search ............... 280/804, 803, 802, 808; 297/469

[56] References Cited

U.S. PATENT DOCUMENTS

| | | | |
|---|---|---|---|
| 3,842,929 | 10/1974 | Wada et al. | 280/804 |
| 3,900,078 | 8/1975 | Otani | 280/804 |
| 3,927,902 | 12/1975 | Lindblad | 280/804 |
| 3,971,570 | 7/1976 | Nilsson et al. | 280/804 |
| 4,061,365 | 12/1977 | Nagaro et al. | 280/804 |

Primary Examiner—Robert R. Song
Attorney, Agent, or Firm—Wyatt Gerber Shoup

[57] ABSTRACT

A seat belt latch device has latch means for retaining an engaging member coupled to a seat belt. The latch means includes inertia sensing means for sensing a predetermined variation in speed of a vehicle, and a retaining member responsive to the sensing operation of the inertia sensing means. The retaining means retains the engaging member when there is a predetermined variation in speed of the vehicle.

3 Claims, 15 Drawing Figures

SEAT BELT LATCH DEVICE

This application is a continuation of application Ser. No. 062,550 filed July 31, 1979 now abandoned.

BACKGROUND OF THE INVENTION

1. Field of the Invention

This invention relates to a seat belt retaining device for an automotive vehicle or the like.

2. Description of the Prior Art

The tendency toward higher speeds of automotive vehicles has come to require seat occupants to wear seat belts. It is usually the practice to manually operate the seat belt each time one gets into and out of the vehicle, but it has recently become desirable to mount a passive device which automatically fastens or releases the belt in response to the opening or closing of a door or to entering and leaving the seat to eliminate the trouble to manually operate the seat belt. Such passive devices, however, typically have suffered from a disadvantage that when an impact is exerted on the vehicle by collision or overturning of the vehicle or when a sudden acceleration or deceleration is applied to the vehicle, the seat occupant maybe thrown out of the vehicle due to the opening of the door and consequent releasing of the belt as a result of the shock of collision or the like. It may occur to mind to provide the belt moving mechanism with an emergency locking device to prevent the belt from being loosened during such impacts, but if this device is operatively associated with a door latch, it could slip out when the door is opened by accident. If the device is made independent of the door latch, the door cannot be opened from outside when locked.

SUMMARY OF THE INVENTION

It is an object of the present invention to eliminate the various disadvantages as noted above and to provide a simple seat belt emergency locking device which can positively retain the seat belt during an impact and which prevents the seat belt from being released even when the belt moving mechanism is pulled intensely or the door is opened.

If the seat belt system is of the passive type which is operatively associated with opening and closing of a door, engaging means connected to the seat belt is constructed as a moving device movable between a seat occupant non-restraining position and a seat occupant restraining position in response to opening and closing of the door, and this moving device is retained in the seat occupant restraining position by retaining means provided on the vehicle body side.

It is an object of the present invention to provide a moving device of simple construction in such a passive type seat belt system.

Further, there is an undesirable possibility that a strong force exerted on drive means for driving such a moving device may destroy the moving device and the retaining means therefor.

It is therefore an object of the present invention to provide a seat belt system in which the moving device and its retaining means are not destroyed irrespective of any strong force exerted on the drive means.

The invention will become fully apparent from the following detailed description thereof taken in conjunction with the accompanying drawings.

DESCRIPTION OF THE PREFERRED EMBODIMENTS

Preferred embodiments of the present invention will hereinafter be described with reference to the drawings.

Figure 1:
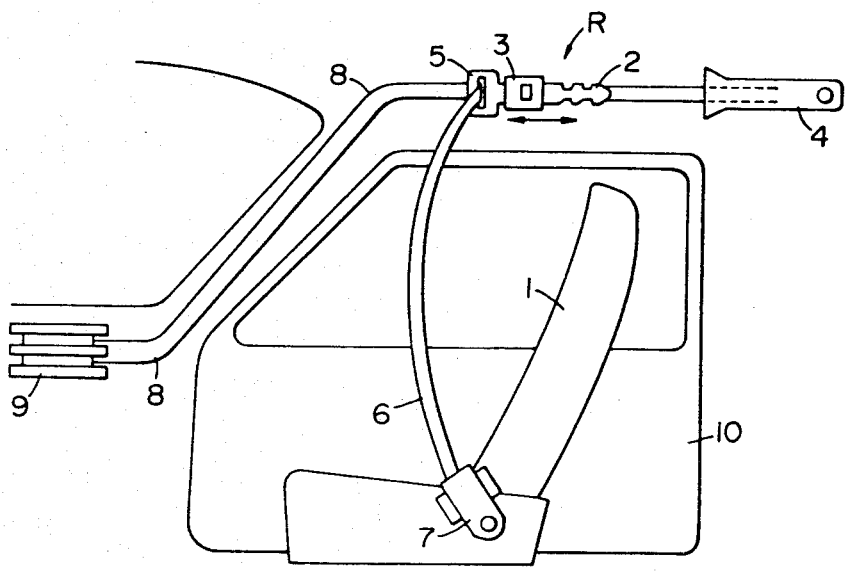
FIG. 1 is a schematic illustration of an example of the passive type seat belt system.

FIG. 1 illustrates a mechanism in which the present invention is carried out in a passive type seat belt in which mounting and dismounting of a belt is effected in response to the opening and closing of a door. The safety belt 6 is connected to a conventional retractor 7 attached to a seat in a vehicle, and the belt 6 is attached to the tongue 5 of an emergency release buckle 3. The buckle 3, the tongue 5 and a tongue portion 2 extending integrally from the tongue together form a runner R. The runner R is pulled by a wire 8 passed over a drive pulley 9 driven by opening and closing of the door, and is movable on a guide (not shown) in the direction of the arrow. When the door is open, the runner R is moved leftwardly as viewed in FIG. 1 and the belt is released to permit a seat occupant to come freely in and out from under the belt, and when the door is closed, the runner R is moved rightwardly by operation of the pulley 9 to tighten the seat belt 6 against the seat occupant. The tongue portion 2 comes into a latch portion 4 attached to the inner wall of the vehicle to hold the seat belt 6 in its tightened condition. An emergency locking device operable during an impact or the like is attached to the latch portion 4, as will hereinafter be described. Of course, the device of the present invention is applicable not only to the passive type seat belt system but also the so-called active seat belt system in which the seat occupant inserts the tongue portion into the latch portion each time he gets into and out of the vehicle.

Figure 2:
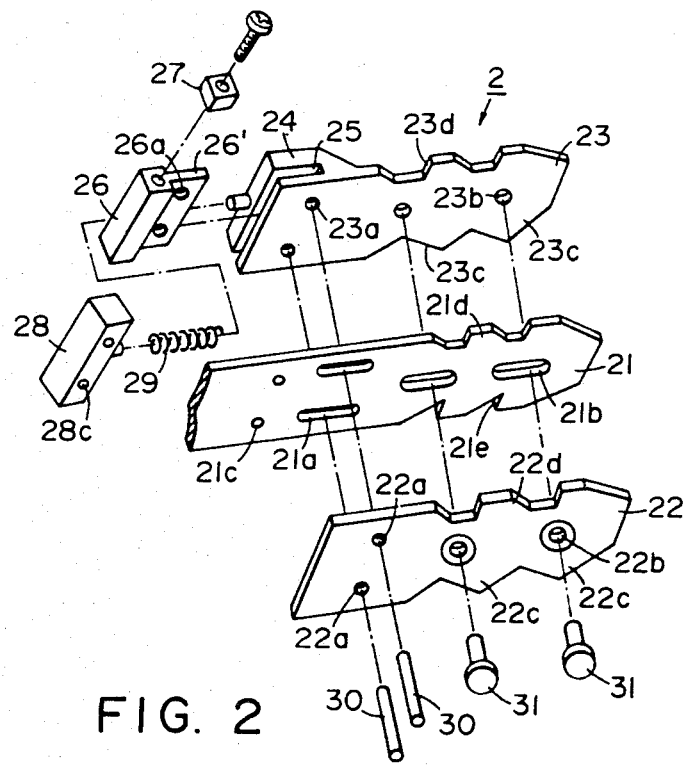
FIG. 2 is an exploded view of the moving device according to an embodiment of the present invention.

FIG. 2 is an exploded view of the tongue portion 2. The tongue portion 2 comprises three parts which are a central base tongue 21 and lateral covers 22 and 23 lying on the opposite sides of the base tongue. The base tongue 21 is connected to the belt 6 through the tongue 5 secured to the emergency release buckle 3 and retained by this buckle. The first lateral cover 22 and the second lateral cover 23 are attached to the opposite sides of the base tongue 21. The two lateral covers 22 and 23 are fastened by caulking pins 31 extending through holes 22b and 23b formed therein and slots 21b formed in the base tongue 21, and the base tongue 21 may thus move slidably between the two lateral covers 22 and 23. The side of the lateral cover 23 adjacent mounting portion 24 having a recess 25 in which the projected portion 26' of a wire fastener 26 is fitted. The wire 8 has a part thereof securely fastened to the wire fastener 26 by means of a wire keeper member 27. Shear pins 30 are passed through holes 22a in the cover 22, slots 21a in the base tongue 21, holes 23a in the cover 23 and holes 26a in the projected portion 26 to secure the wire fastener 26 to the cover 23. These shear pins may be broken when a strong force of a predetermined magnitude is exerted on the wire, to permit separation between the cover 23 and the wire fastener 26 and thereby prevent any further force from being exerted on the tongue portion 2 by the wire. A spring support 28 is secured to the base tongue 21 by inserting a pin (not shown) through a hole 28c in the spring support and a hole 21c in the base tongue 21. A spring 29 is interposed between the mounting portion 24 and the spring support 28 to bias rightwardly the fasteners for the lateral covers 22 and 23 relative to the base tongue 21. Thus, the shear pins 30 and caulking pins 31 normally contact the right end of the slots 21a, 21b of the base tongue 21 (see FIGS. 4 and 5).

Figure 3:
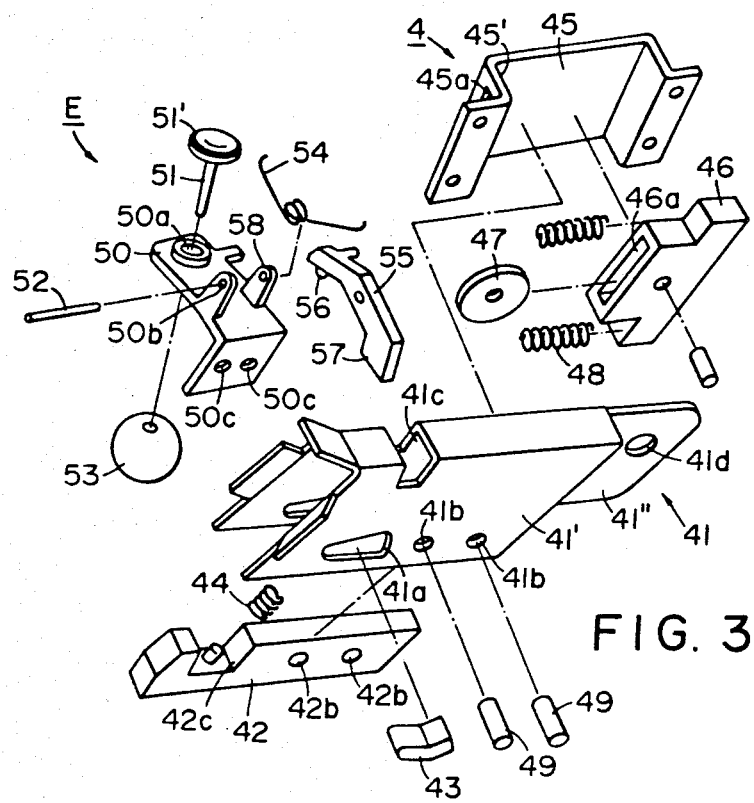
FIG. 3 is an exploded view of the vehicle body side retaining means of the embodiment of FIG. 2.

FIG. 3 shows the details of the latch portion 4 and emergency locking device E. A housing 41 into which the tongue portion 2 is to be inserted is in the form of a box having an open lower end and having an outer plate 41' and a base 41" attached to the inner wall of the vehicle. The outer plate 41' has a sector hole 41a into which a pallet 43 is fitted and holes 41b for receiving pins 49 holding a lateral member 42 in position, and the base 41" also has a hole 41d for mounting the same onto the vehicle.

The lateral member 42 may be attached to the housing 41 by inserting it into the lower open end of the housing 41 and inserting the pins 49 into the holes 41b of the base and 42b of the lateral member. A spring 44 is provided in a cavity formed by the pallet 43 in the sector hole 41a of the housing and the recess 42c of the lateral member. A bottom plate 45 is mounted on the opposite side of the base 41" and a slider 46 is placed within the bottom plate, and a pulley 47 for turning back the wire 8 is contained in a recess 46a of the slider. Springs 48 are interposed between an end wall 45' at the side of the bottom plate 45 which is adjacent to the belt (the left side as viewed in FIG. 3) and the slider 46. This end wall 45' is formed with a hole 45a through which the wire may pass. Thus, the wire 8 is turned back by the pulley 47 from the drive pulley 9 through the wire fastener 26 and guided by the drive pulley 9. Accordingly, when the drive pulley 9 drives the wire 8 in accordance with the opening and closing of the door, the runner R including the tongue portion 2 moves leftwardly or rightwardly.

Further, a lever supporting bed 50 is attached to that side of the base 41' which is adjacent to the belt (the left side as viewed in FIG. 3) as by inserting screws into holes 50c. A lever 55 is tiltably mounted on projected portions 58 of the supporting bed 50 by means of a pin 52 passing through holes 50b in the projected portions 58. A rod 51 is passed through a hole 50a in the supporting bed 50 and a pendulum 53 is attached to the lower end of the rod 51, and a semi-spherical head 56 of the lever 55 rests on the upper flat head 51' of the rod 51. When the pendulum swings upon an impact exerted on the vehicle, the head 56 of the lever is pushed by the flat head 51' so that the lever 55 is tilted to cause the end 57 thereof to move into a cut-away 41c formed in the upper wall of housing 41.

On the upper side edges of the three pieces 21, 22 and 23 of the tongue portion 2, there are provided similarly configured teeth 21d, 22d and 23d which are engageable with its end 57 of the lever through the cut-away 41c. On the opposite side, the base tongue 21 has teeth 21e engageable with the pallet 43, and the covers 22 and 23 have teeth 22c and 23c each having a gently inclined cam surface for releasing the engagement between the tooth 21e and the pallet 43, as will be described below.

Operation of the device of the present invention will now be described.

Figure 4:
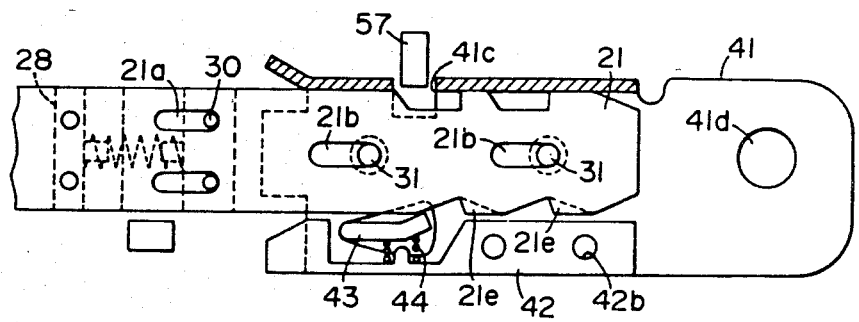
FIG. 4 is a schematic cross-sectional view showing the moving device retained by the retaining means.
Figure 5:
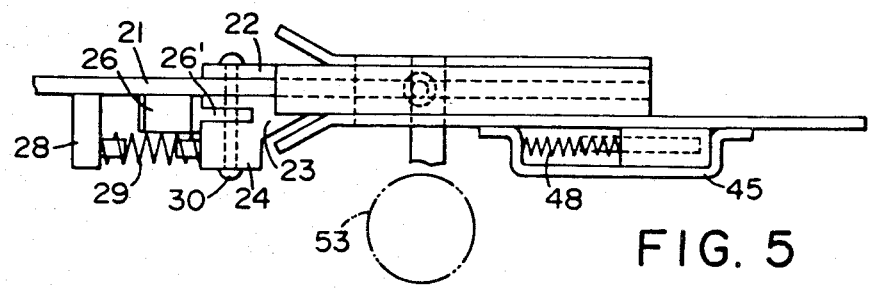
FIG. 5 is a bottom view corresponding to FIG. 4.

FIG. 4 shows a position in which the tongue portion 2 has come into the housing 41 but the lever end 57 of lever 55 has not yet come into the cut-away 41c. FIG. 5 is a bottom view of the structures shown in FIG. 4. When the tongue portion is assembled, as described previously, the spring 29 presses the portion between the spring support 28 attached to the base tongue 21 and the thick-walled portion of the second lateral cover 23, whereby the second lateral cover 23 and the first lateral cover 22 fastened thereto are pushed relative to the base tongue 21 rightwardly as viewed in the Figure, and as shown in FIGS. 4 and 5, the shear pins 30 and the caulking pins 31 are in contact with the right end of the slots 21a and 21b of the base tongue 21. As already mentioned, when the door is opened, the wire 8 on that side which is held to the cover 23 of the tongue portion 2 is directly pulled toward the pulley 9 and, when the door is closed, the wire is pulled by the drive pulley 9 through the pulley 47 and therefore, the runner R including the tongue 2 is pulled rightwardly and the tongue portion 2 is inserted into the housing 41 of the latch portion 4, so that the belt 6 restrains the seat occupant.

Figure 6:
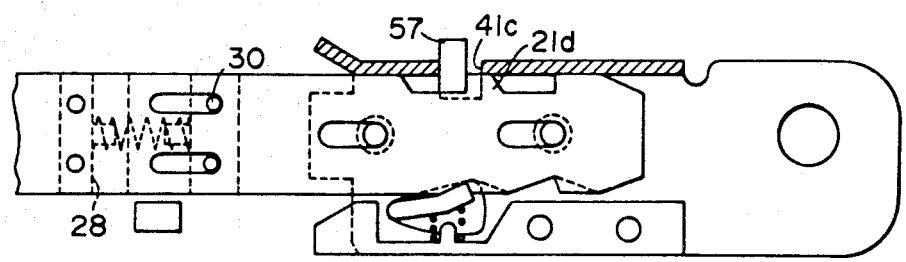
FIG. 6 is a view similar to FIG. 4 and showing the moving device retained by an emergency locking means.
Figure 8:
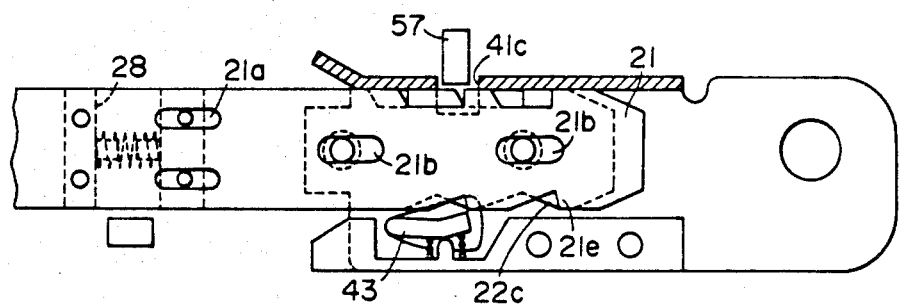
FIG. 8 is a view showing the moving device released from the retaining means.
Figure 9:
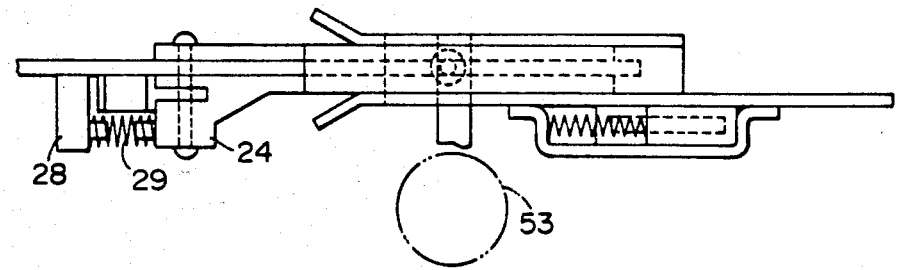
FIG. 9 is a bottom view corresponding to FIG. 8.

Even if the belt 6 is pulled and the base tongue 21 tries to move leftwardly in the Figure, a tooth 21e of the base tongue 21 is engaged with the pallet 43 inwardly forced by the spring 44, to thereby prevent the tongue portion 2 from slipping out (see FIG. 6). When the door is opened, the wire now pulls leftwardly the runner including the tongue portion. When the wire pulls the two covers 22 and 23, in FIGS. 8 and 9 which are similar to FIGS. 4 and 5, the base tongue 21 is held by the tooth 21e thereof engaged with the pallet 43, so that the two covers 22 and 23 leftwardly move relative to the base tongue 21 through the slots 21a and 21b against the force of the spring 29, and the gently inclined teeth 22c and 23c slide over the pallet 43 to force the pallet 43 outwardly against the force of the spring 44, and thus the engagement between the pallet 43 and the tooth 21e is released and the entire tongue portion 2 is leftwardly disengaged from the housing 41, whereby the runner is moved leftwardly to bring about a seat occupant non-restraining position.

Figure 7:
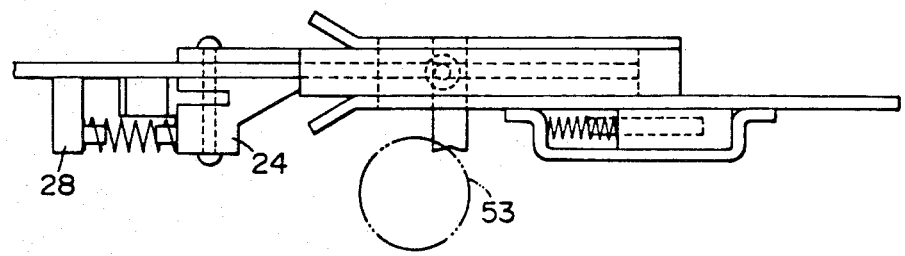
FIG. 7 is a bottom view corresponding to FIG. 6.
Figure 10:
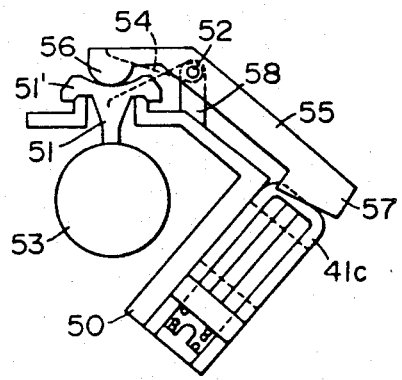
FIG. 10 is a partial illustration of the pendulum type inertia sensing means.
Figure 11:
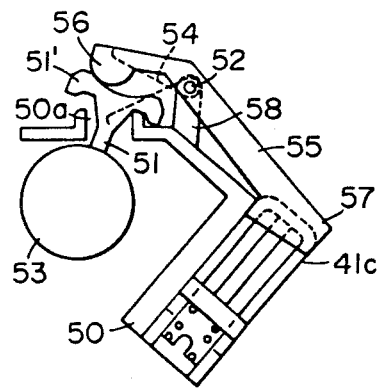
FIG. 11 shows the operative state of the inertia sensing means.
Figure 12:
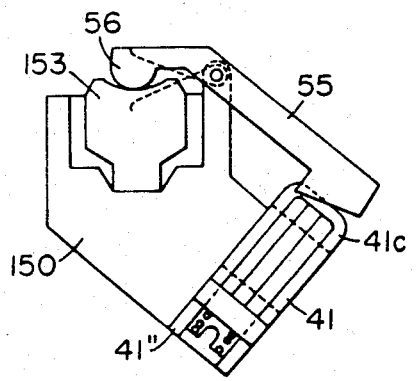
FIG. 12 is an illustration of a standing pendulum inertia sensing means.
Figure 13:
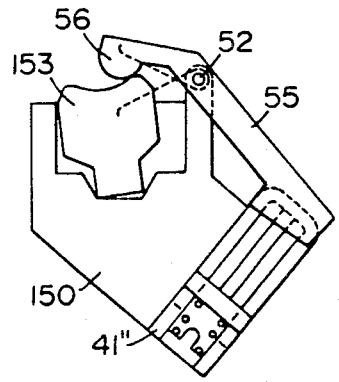
FIG. 13 illustrates the operation thereof.
Figure 14:
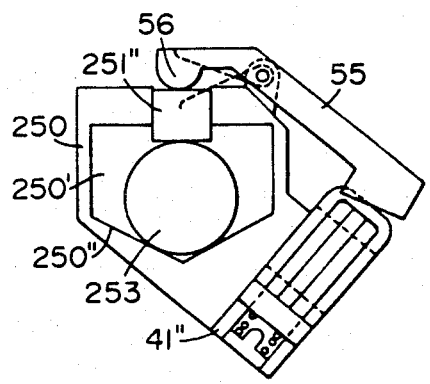
FIG. 14 is an illustration of an inertia sensing means using a ball.

FIGS. 10 and 11 show an embodiment of the inertia device of the emergency locking device of the present invention. FIG. 10 shows the device in a normal position in which the pendulum 53 depends to vertically and FIG. 11 shows the device in a position in which the pendulum has swing due to an impact. When the pendulum swings due to an impact as shown in FIG. 11, the head 56 of the lever 55 is pushed by the flat head 51' of the rod 51 of the pendulum 53 and the lever tilts about the pin 52 so that the end 57 of the lever comes into the cut-away 41c and engages the teeth 21d, 22d and 23d of the tongue portion as shown in FIGS. 6 and 7. The tongue portion is thus held in position even if the door should be flung open. A torsion spring 54 is wound on the pin 52 and secured to the lever and the supporting bed. By selecting the strength of the torsion spring, design can be such that the pendulum does not operate unless an impact greater than 1 G is exerted and the emergency locking device is not operated during the stoppage of the vehicle on a steep slope or during the overturn of the vehicle when a great shock such as that during collision is not exerted.

Figure 15:
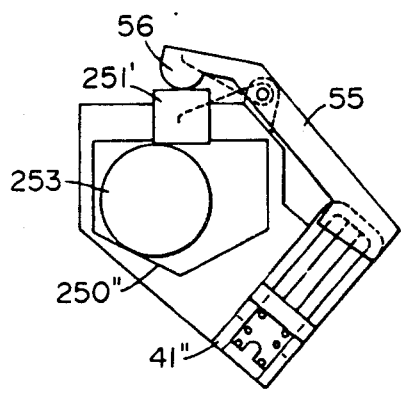
FIG. 15 illustrates the operation thereof.

FIGS. 12 through 15 show further embodiments of the inertia device. In the embodiment shown in FIGS. 12 and 13, a vertical weight 153 stands upright on a supporting bed 150 attached to the base 41" and the head 56 of the lever 55 rests on top of the weight 153. When the weight is tilted by an impact, the head of the lever 55 is pushed to tilt the lever. In the embodiment shown in FIGS. 14 and 15, the supporting bed 250 attached to the base 41" has a cavity 250' having an inclined surface 250" and contains a steel ball 253 therein. The head 56 of the lever 55 rests on the steel ball with a pressing member 251' interposed therebetween. Normally, the steel ball 253 is located in the lowermost bottom of the cavity, but when subjected to a shock, the steel ball moves on the inclined surface 250" due to inertia to thereby raise the pressing member 251' and accordingly, raises the head 56 of the lever 55 upwardly as shown in FIG. 15. By this, the lever 55 is tilted.

Description will now be made of the action of the shear pin 30. As shown in FIG. 6, during an impact, the end 57 of the lever 55 comes into the cut-away 41c to hold the teeth 21d, 22d and 23d to prevent to tongue portion 2 from slipping out and prevent the belt from being released even if the door should be flung open violently. If the lever is made of a metal material, it will be sturdy but heavy so that a large pendulum or the like will be required to operate the lever, whereas if the lever is made of synthetic resin, it will be light in weight but not sufficiently strong so that if a great impact load greater than a certain degree is exerted by the door being flung open violently, the lever itself might be destroyed. Therefore, the shear pin 30 is inserted through the hole 22a of the first lateral cover 22, the hole 21a of the base tongue 21 and the hole 23a of the second lateral cover 23 to thereby fix the projected portion 26' of the wire fastener 26 in the recess 25 of the mounting portion 24 of the cover 23. The shear strength of the shear pin 30 is selected to a level weaker than that of the lever 55. If the wire 8 is pulled by a force stronger than the shear strength of the shear pin, the shear pin will be broken and only the wire fastener 26 will slip out of the recess 25 of the cover 23 by being pulled by the wire 8, so that no more force will be exerted on the tongue portion 2. In this manner, the shear pin will first be broken if the door should be flung open violently and therefore, the lever 55 will never be broken.

In the emergency locking device according to the present invention, as has hitherto been described, when subjected to a sudden impact during collision or the like, the inertia device such as a pendulum or the like is operated to tilt the lever and prevent the tongue portion from slipping out of the latch portion due to the impact and when the inertia device restores its horizontal position upon stoppage of the impact, the lever becomes disengaged so that the seat occupant may open the door to release the seat belt or if the opening-closing mechanism operatively associated with the door has gone wrong, the seat occupant may depress the button of the emergency release buckle 3 attached to the tongue portion to remove the safety belt. Since the slider 46 containing therein the pulley 47 on which one end of the wire 8 is wound is supported by the spring 48, the slider 46 and accordingly, the tongue portion 2 may move when a great force is exerted on the wire 8, so that application of an unreasonable force is generally avoided and the engagement of the teeth of the tongue may be well effected.

The present invention provides a simple seat belt emergency locking device of the above-described construction which is reliable in operation. It will be apparent that the present invention is applicable to various embodiments without departing from the spirit of the invention as defined in the appended claims.

What I claim:

1. A latch device mountable within a vehicle for holding securely a tongue portion attached to the end portion of a seat belt unwound from a retractor secured to the vehicle, said latch device including a latch portion adapted to receive said tongue portion for holding it securely in place; drive means for moving said tongue portion toward said latch portion upon closing of the vehicle door and way from said latch portion during opening of the vehicle door; said latch portion including a movable retaining member biased into a position engaging said tongue portion in its forward position; said tongue portion including a base portion secured to the end portion of said seat belt, and a movable portion held slidably to said base portion and attached to said drive means so as to be slid rearwardly long said base portion when the vehicle door is opened; said base portion being adapted to be held by said retaining member and said movable member having a cam surface moving said retaining member out of engagement with said base member during rearward movement thereof to release said tongue portion during opening of the vehicle door; and further including means to dis-connect said movable member from said drive means when said drive means exerts on said movable member a force greater than a predetermined value.

2. A latch device mounted within a vehicle for holding securely a tongue portion attached to the end portion of a seat belt unwound from a retractor secured to the vehicle; said latch device including a latch portion adapted to receive said tongue portion for holding it securely in place; release means connected to said tongue portion and the door of the vehicle and operable upon opening of the vehicle door for releasing said tongue from said latch portion, and means for dis-connecting said release means from the door of the vehicle if the opening of the door exerts a force greater than a predetermined value.

3. A latch device according to claim 2, further including inertia sensing means associated with said latch portion for holding said tongue portion therewithin in response to a predetermined variation in the speed of the vehicle even if said door should inadvertently be opened during an accident involving said vehicle.

* * * * *

UNITED STATES PATENT AND TRADEMARK OFFICE
CERTIFICATE OF CORRECTION

PATENT NO. : 4,533,158
DATED : August 6, 1985
INVENTOR(S) : Takeo Ueda

It is certified that error appears in the above—identified patent and that said Letters Patent is hereby corrected as shown below:

On the title page:

After line [22] insert:

[30] Foreign Application Priority Data
    August 8, 1978 (JAP)  Japan................96528/78
    August 8, 1978 (JAP)  Japan................76529/78

Signed and Sealed this

Fifth Day of November 1985

[SEAL]

Attest:

Attesting Officer

DONALD J. QUIGG

Commissioner of Patents and Trademarks